(12) United States Patent
Seki et al.

(10) Patent No.: US 6,888,288 B2
(45) Date of Patent: May 3, 2005

(54) VIBRATION MEMBER AND VIBRATION WAVE DRIVING APPARATUS USING THE VIBRATION MEMBER

(75) Inventors: Hiroyuki Seki, Tochigi (JP); Nobuyuki Kojima, Kanagawa (JP); Kiyoshi Nitto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 10/323,687

(22) Filed: Dec. 20, 2002

(65) Prior Publication Data

US 2003/0122451 A1 Jul. 3, 2003

(30) Foreign Application Priority Data

Dec. 27, 2001 (JP) ...................................... 2001-397909

(51) Int. Cl.[7] .............................................. H02N 2/16
(52) U.S. Cl. .................................................. 310/323.16
(58) Field of Search ................................ 310/328, 323, 310/316–317, 325; H02N 2/66; H01L 41/09

(56) References Cited

U.S. PATENT DOCUMENTS

| | | | |
|---|---|---|---|
| 4,672,256 A | 6/1987 | Okuno et al. ............... 310/323 |
| 4,692,650 A | 9/1987 | Okumura et al. ........... 310/323 |
| 4,692,651 A | 9/1987 | Hiramatsu et al. .......... 310/323 |
| 4,692,652 A | 9/1987 | Seki et al. .................. 310/323 |
| 4,752,711 A | 6/1988 | Tsukimoto et al. ......... 310/323 |
| 4,965,482 A * | 10/1990 | Ohnishi et al. ......... 310/323.13 |
| 5,099,167 A | 3/1992 | Kimura et al. .............. 310/323 |
| 5,128,580 A | 7/1992 | Maeno et al. ............... 310/323 |
| 5,140,214 A | 8/1992 | Kimura et al. .............. 310/323 |
| 5,155,407 A | 10/1992 | Kimura et al. .............. 310/323 |
| 5,180,941 A | 1/1993 | Seki et al. .................. 310/323 |
| 5,187,406 A | 2/1993 | Seki ........................... 310/323 |
| 5,192,890 A | 3/1993 | Kimura et al. .............. 310/323 |
| 5,241,234 A | 8/1993 | Seki et al. .................. 310/323 |
| 5,274,294 A | 12/1993 | Kimura et al. .............. 310/323 |
| 5,387,835 A * | 2/1995 | Tsukimoto et al. ..... 310/323.13 |
| 5,484,216 A | 1/1996 | Kimura et al. .............. 400/319 |
| 5,596,242 A | 1/1997 | Seki et al. .................. 310/328 |
| 5,646,469 A * | 7/1997 | Tsukimoto et al. ..... 310/323.01 |
| 5,698,929 A | 12/1997 | Seki et al. .................. 310/323 |
| 5,739,621 A | 4/1998 | Atsuta et al. ............... 310/316 |
| 5,770,916 A | 6/1998 | Ezaki et al. ................ 310/366 |
| 6,051,911 A | 4/2000 | Kojima et al. .............. 310/323 |
| 6,191,520 B1 | 2/2001 | Maruyama et al. ..... 310/323.06 |
| 6,380,660 B1 | 4/2002 | Maeno et al. .......... 310/323.02 |
| 6,404,104 B1 | 6/2002 | Maeno et al. .......... 310/323.02 |
| 6,628,046 B2 * | 9/2003 | Seki ....................... 310/323.04 |
| 2002/0101134 A1 | 8/2002 | Tsukimoto et al. ..... 310/323.03 |
| 2002/0109434 A1 | 8/2002 | Seki ........................... 310/321 |
| 2002/0145363 A1 | 10/2002 | Ohno et al. ................. 310/330 |

* cited by examiner

Primary Examiner—Thomas M. Dougherty
Assistant Examiner—Karen Addison
(74) Attorney, Agent, or Firm—Fitzpatrick, Cella, Harper & Scinto

(57) ABSTRACT

A vibration member for use in a vibration wave driving apparatus, and a vibration wave driving apparatus, the vibration member including an elastic member having a through hole, a fastening member having a threaded portion, an electro-mechanical energy transducer having a through hole, and a shaft inserted into the through holes of the elastic member and the electro-mechanical energy transducer, the shaft having a threaded screw portion that meshes with the threaded portion of the fastening member, and a step that restricts a position of the elastic member relative to the shaft in a thrust direction, wherein the elastic member is sandwiched between the step of the shaft and the fastening member and fixed therebetween by screwing and fastening the threaded screw portion of the shaft with the threaded portion of the fastening member, and the shaft is restricted from rotating relative to the elastic member.

19 Claims, 12 Drawing Sheets

VIBRATION MODE
(DISPLACEMENT IN R-DIRECTION)

VIBRATION MEMBER AND VIBRATION WAVE DRIVING APPARATUS USING THE VIBRATION MEMBER

BACKGROUND OF THE INVENTION

1. Field of the Invention

The present invention relates to a vibration wave driving apparatus, such as an ultrasonic motor, and to a vibration member for use in the vibration wave driving apparatus.

2. Description of the Related Art

An ultrasonic motor (vibration wave driving apparatus) may be employed as, e.g., a driving source for a camera lens. Two types of ultrasonic motors include one having a ring-shaped vibration member and another one having a bar-shaped vibration member.

FIGS. 13A and 13B illustrate a conventional bar-shaped vibration member; specifically, FIG. 13A is a longitudinal sectional view of the vibration member, and FIG. 13B shows a vibration mode of the vibration member in the radial (R) direction. FIG. 14 shows a bar-type ultrasonic motor using a vibration member differing in construction from the vibration member of FIG. 13. FIG. 15 shows a bar-type ultrasonic motor using the vibration member of FIG. 13.

Referring to FIG. 13, the vibration member comprises a first elastic member 1 made of a metal, a second elastic member 2 made of a metal, a multilayered piezoelectric device (or a laminate of single-plate type piezoelectric devices) 3 serving as an electro-mechanical energy transducer, a shaft 4 having a step 4a formed substantially in its central area with a larger outer diameter than other areas and having threaded portions at opposite ends thereof (not shown), and a nut 5. The multilayered piezoelectric device 3 and a flexible printed circuit board (not shown) are disposed between the two elastic members 1 and 2. Using those parts, the vibration member is assembled as follows. The shaft 4 is inserted so as to penetrate through hollow central portions of the first elastic member 1, the multilayered piezoelectric device 3, the flexible printed circuit board, and the second elastic member 2, until the step of the shaft 4 abuts against the first elastic member 1. The nut 5 is screwed and fastened over the threaded end of the penetrating shaft 4 so that the multilayered piezoelectric device 3 is firmly fixed between the two elastic members 1 and 2 under a predetermined compressive force.

The vibration member in the ultrasonic motor of FIG. 14 utilizes an alternative structure including a shaft 4 in the form of a bolt. A laminate of single-plate type piezoelectric devices is firmly sandwiched between the first elastic member 1 and the second elastic member 2 by screwing a threaded portion formed substantially in an axially central area of the shaft 4 with a threaded portion formed at an inner periphery of the first elastic member 1.

In FIGS. 14 and 15, a rotor 7 has a structure in which a spring ring contacts an upper surface of the first elastic member 1, where the spring ring has a small contact width and appropriate resiliency, the spring ring is disposed below a main rotor ring, and a distal end surface of the spring ring is positioned in contact with a frictional surface of the vibration member. The other surface of the rotor 7, on a side opposite the spring ring, has a projection (or a recess) formed thereon (therein) for mating a recess (a projection) of a gear 8 that is rotated together with the rotor for transmitting a motor output. The gear 8 is fixedly positioned in the thrust direction of the shaft 4 by a flange 10 for mounting the motor, and a pressing spring 15 for imparting a pressing force to the rotor 7 is disposed between the gear 8 and the rotor 7. A ring bearing 9 is provided between the gear 8 and the flange 10, to prevent rotation. A nut 11 is screwed over a threaded distal end portion of the shaft 4 for fixing the flange 10 in place.

Electrodes of the multilayered piezoelectric device 3 (or the laminate of single-plate type piezoelectric devices) are divided into two electrode groups. When AC voltages having different phases are applied to the respective electrode groups from a power supply (not shown), the vibration member is excited with two modes of bending vibrations having orthogonal displacements, as shown in FIG. 13B (FIG. 13B shows one mode of the vibration displacements; the other mode of the vibration displacements occurs in a direction perpendicular to the drawing sheet). By adjusting the phases of the applied voltages, the two modes of vibrations can be provided with a 90-degree phase difference in time. As a result, the bar-shaped vibration member can be excited with gyrating motions in such a manner that the vibration member rotates about its axis.

Consequently, an elliptic motion is developed on the upper surface of the first elastic member 1 which is in contact with the rotor 7. The rotor 7 pressed against the wear-resistant surface member of the first elastic member is thus frictionally driven, whereby the rotor 7, the gear 8 and the pressing spring 15 are rotated as a unit in opposed relation to the first elastic member.

FIG. 15 illustrates a modification of the ultrasonic motor of FIG. 14. This version has a simplified structure that reduces the cost of manufacture. In the vibration member of FIG. 14, because a lower end portion of the shaft 4 has a large diameter, the shaft must be cut from a large-diameter material. Therefore, a longer relative working time is required and the material cost is wastefully increased. Another disadvantage is that, since the shaft has a large diameter difference between an upper portion and a lower portion thereof, the vibration member of FIG. 14 is not suitable for plastic working, such as forging, which is relatively inexpensive; rather, the shaft must be formed by machining.

The ultrasonic motor of FIG. 15 is free from those disadvantages. Namely, the ultrasonic motor of FIG. 15 reduces the cost of manufacturing by forming a shaft into a shape obtainable by forging.

The bar-type ultrasonic motors of FIGS. 13 to 15 are much smaller than ring-type ultrasonic motors, and individual parts are simpler in shape than those of the ring-type ultrasonic motors, thereby minimizing the working cost of the parts.

In order to further reduce the motor size, a proposal for shortening the motor length has also been made.

With a reduction of the motor size, however, the part size is also reduced, which is disadvantageous from the standpoint of part strength. Assuming, for example, the case of manufacturing a motor using a vibration member that has a size reduced to ½ of the vibration member of FIG. 13, the diameters of the elastic members and the shaft are reduced to ½ and therefore the area of a contact surface between the elastic member 1, 2 and the piezoelectric device 3 is reduced to ¼.

To keep the surface pressure in such a contact surface equal to that before the size reduction, the cross-sectional area (i.e., the tensile strength) of the shaft can be reduced to ¼ without problem because the fastening force required for tightening the nut against the shaft is also reduced to ¼.

When the elastic members are fastened using screws, as with the vibration member of FIG. 13, the required fastening torque also becomes ¼ on condition that the fastening torque is proportional to the compressive force in the axial direction of the shaft. However, since the maximum shearing stress $\tau$ generated in the shaft is expressed by $\tau=16T/\pi d^3$ (where T is the fastening torque and d is the shaft diameter), it becomes twice that generated in the shaft having the original size. In other words, the strength of the shaft is reduced to ½ if the same material is used. Particularly, where one end portion (upper half portion) of the shaft has a smaller diameter as shown in FIG. 13, the following problem occurs. In fastening the nut 5 with a jig 24 as shown in FIG. 17, the shaft 4 is fixed using a jig 25 and prevented from turning. However, when the nut is fastened with the jig 25 gripping the smaller-diameter portion of the shaft 4, a torsional rupture is apt to occur in the smaller-diameter portion. Hence, the fastening torque cannot be applied at a sufficient level.

Also, for a vibration member having a size larger than a certain value, as shown in FIG. 16, the vibration member can be assembled by applying a prestress (indicated by P in FIG. 16) from above while supporting the step of the shaft 4 with a jig 23 or the like, holding the shaft 4, the elastic members 1, 2 and the piezoelectric device 3 together in a fixed condition, and then fastening the nut 5 with a jig 22 fitted over the nut 5. For a vibration member having a small size (with the shaft diameter of, for example, not more than 2 mm), however, even a space for allowing insertion of the jig 23 cannot be ensured.

On the other hand, when such a Langevin vibration member as shown in FIG. 13 has a structure wherein the first elastic member 1 is formed with a threaded portion similar to that of the nut 5 and the piezoelectric device is fastened while gripping the nut 5 and the first elastic member 1, a difficulty arises in setting, to a predetermined position, the relative position of a group of the elastic members 1, 2, the piezoelectric device 3 and the nut 5, which are fastened into a single unit, with respect to the shaft 4 in the thrust direction thereof.

More specifically, when the nut 5 is rotated and fastened while the first elastic member 1 is fixedly gripped, the shaft 4 is also rotated together with the nut 5 by frictional forces produced in the threaded portion of the nut 5. Therefore, the shaft 4 is moved upward, as viewed in FIG. 13, relative to the first elastic member 1. In other words, as the nut 5 is rotated and fastened, the first elastic member 1 is moved farther away from the flange 10. Because the amount by which the shaft 4 is moved differs depending on each case, it is difficult to always arrange the shaft 4 and the first elastic member 1 in the same relative position. This leads to a difficulty in setting a constant rotor pressing force in the structure wherein the rotor pressing force is defined/set depending on the distance between the flange 10 fixed to the shaft 4 and the first elastic member 1.

SUMMARY OF THE INVENTION

According to one aspect, the present invention provides a vibration member wherein an elastic member and an electro-mechanical energy transducer are disposed between a step formed on a shaft penetrating through a hollow central portion thereof and a fastening member in screw mesh engagement with a threaded portion formed on the shaft, and by fastening the fastening member to the shaft, the elastic member and the electro-mechanical energy transducer are fixed, the shaft being restricted from rotating about a shaft axis relative to the elastic member.

According to another aspect, the present invention provides a vibration member wherein an elastic member and an electro-mechanical energy transducer are disposed between a step formed on a shaft penetrating through a hollow central portion thereof and a fastening member in screw mesh engagement with a threaded portion formed on the shaft, and by fastening the fastening member to the shaft, the elastic member and the electro-mechanical energy transducer are fixed. In the vibration member, the elastic member has a threaded portion formed in an inner wall thereof and screwed with another threaded portion formed on the shaft. Meshing between the elastic member and the shaft and meshing between the fastening member and the shaft cause the elastic member and the fastening member to rotate in opposed directions when screwed.

According to still another aspect, the present invention provides a vibration wave driving apparatus including one of the above vibration members.

Further objects, features and advantages of the present invention will become apparent from the following description of the preferred embodiments with reference to the attached drawings.

DESCRIPTION OF THE PREFERRED EMBODIMENTS

Figure 1:
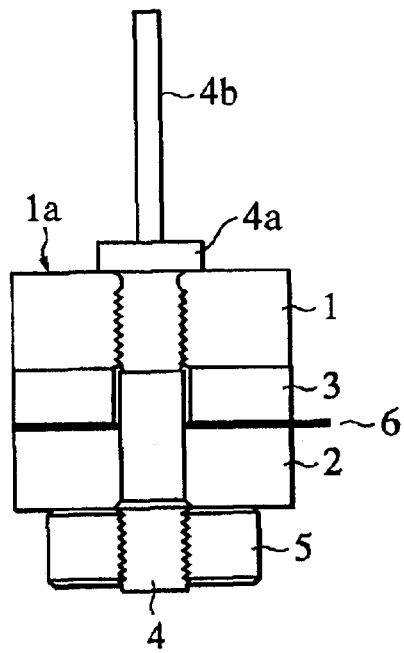
FIG. 1 is a sectional view of a vibration member according to one embodiment of the present invention.

FIG. 1 shows a vibration member according to one embodiment of the present invention. Referring to FIG. 1, the vibration member comprises a first elastic member 1, a second elastic member 2, a multilayered piezoelectric device 3, a shaft 4, and a nut 5. It is assumed hereinafter that the longitudinal direction of the shaft is the axial direction of the vibration member. Substantially at the center of the shaft 4 in the axial direction, a step 4a is formed which has a larger diameter than the other portion of the shaft 4. The first elastic member 1, the second elastic member 2, the multilayered piezoelectric device 3 serving as an electro-mechanical energy transducer, and a flexible printed circuit board 6 for applying AC voltages to the multilayered piezoelectric device 3 from an external power supply (not shown) are fixedly sandwiched between the step 4a and the nut 5. The multilayered piezoelectric device 3 and the flexible printed circuit board 6 are disposed between the two elastic members 1 and 2.

Right-handed second threaded portions are formed (as male threads) at an outer periphery of a lower end of the shaft 4 and (as female threads) at an inner periphery of the nut 5. By fastening the nut 5 over the lower end of the shaft 4, a compressive force is applied to the components sandwiched between the step 4a and the nut 5 so that the components are brought into a firmly fixed state.

Left-handed first threaded portions are formed (as male threads) at an outer periphery of a portion of the shaft 4 below the step 4a and (as female threads) at an inner periphery of the first elastic member 1. The first elastic member 1 is fixed over the shaft 4 by being screwed until an upper surface 1a of the first elastic member 1 abuts against a lower surface of the step 4a. In other words, the position of the first elastic member 1 in the thrust (axial) direction is restricted by the step 4a.

Of the shaft 4, a portion over which the first elastic member 1, the multilayered piezoelectric device 3 and the second elastic member 2 are fitted is referred to as a sandwich portion, while a portion locating on the side opposite the sandwich portion with respect to the step 4a is referred to as a support portion 4b. The whole of the vibration member is supported by fixing a distal end of the support portion 4b. The support portion 4b of the shaft 4 is formed with a smaller outer diameter than that of the sandwich portion. The reason is in giving the shaft 4 a sufficient elasticity so as not to impede vibrations excited on the vibration member when the vibrations are excited on the vibration member by applying AC voltages to the multilayered piezoelectric device 3 with the distal end of the support portion held fixed.

Figure 14:
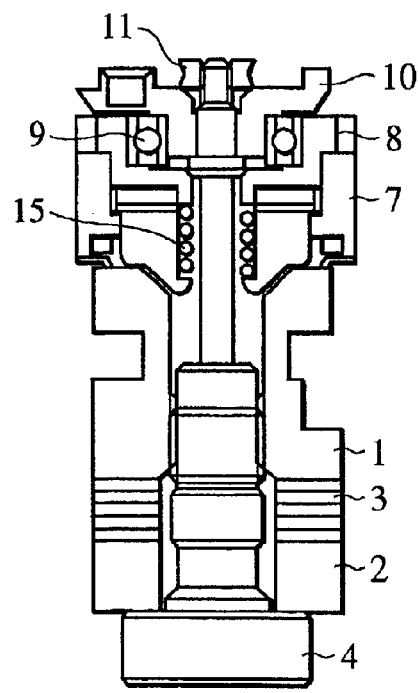
FIG. 14 is a sectional view of a vibration wave driving apparatus (ultrasonic motor) using a conventional bar-shaped vibration member.
Figure 15:
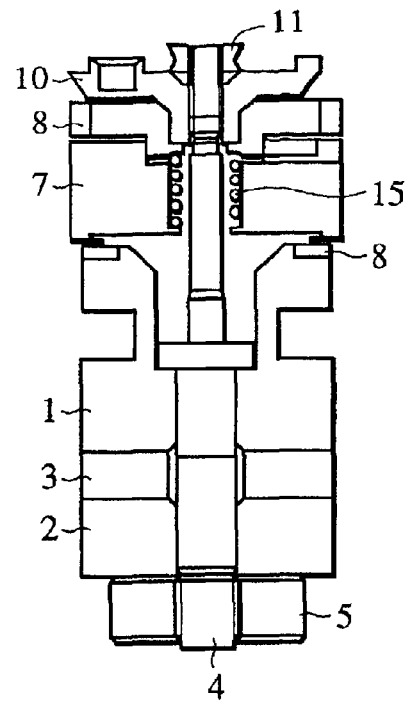
FIG. 15 is a sectional view of a vibration wave driving apparatus (ultrasonic motor) using the bar-shaped vibration member shown in FIG. 13.
Figure 16:
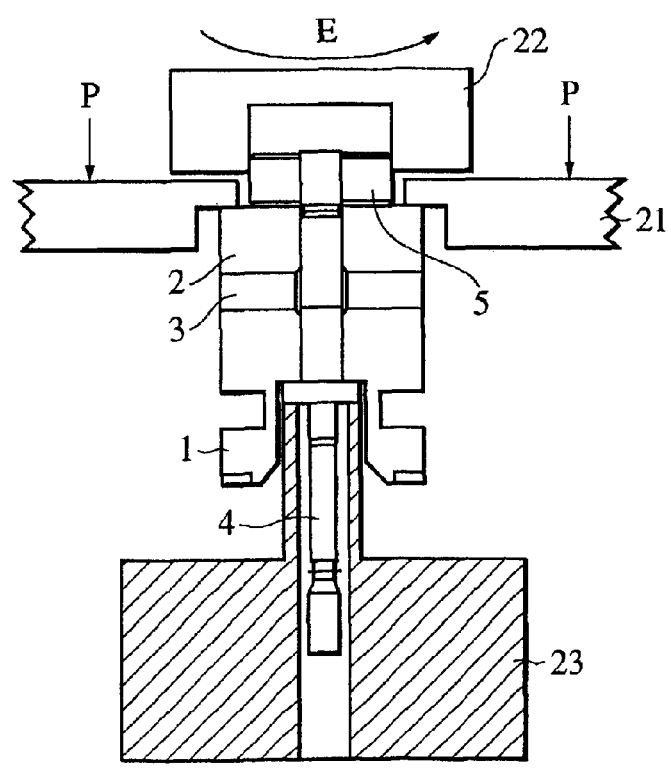
FIG. 16 is an explanatory view for explaining assembly of one conventional bar-shaped vibration member.
Figure 17:
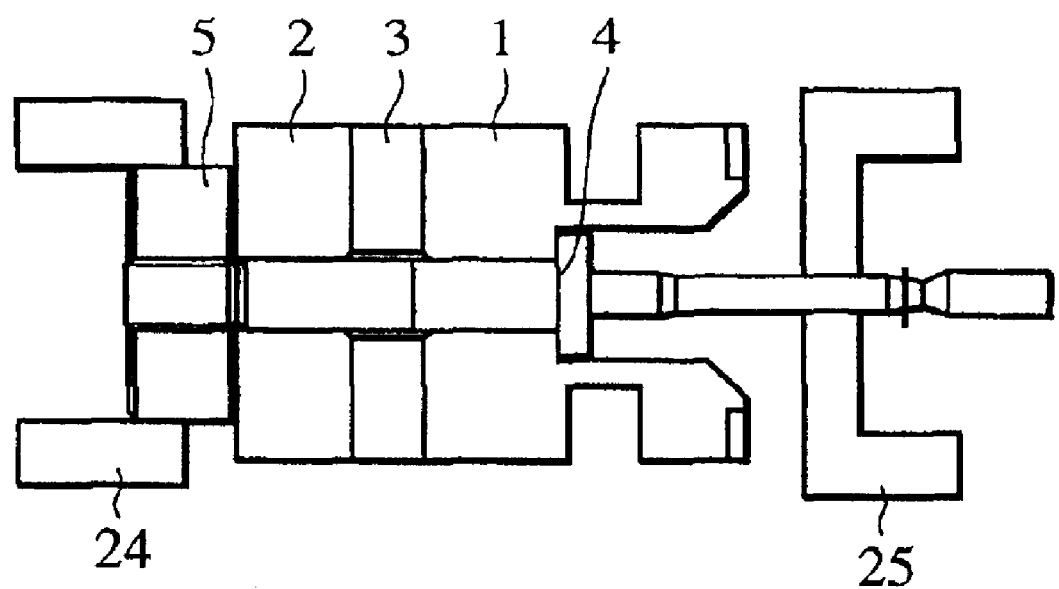
FIG. 17 is an explanatory view for explaining assembly of another conventional bar-shaped vibration member.

The vibration member of this embodiment is assembled through the steps of screwing the first elastic member 1 over the first threaded portion of the shaft 4, fitting the multilayered piezoelectric device 3, the flexible printed circuit board 6 and the second elastic member 2 over the shaft 4 in succession, and finally screwing the nut 5 over the second threaded portion of the shaft 4. The screwing of the nut 5 causes the shaft 4 to rotate with friction developed therebetween in the same direction as that in which the nut 5 is turned. With the rotation of the shaft 4 in the same direction as the nut 5, a force pushing the first elastic member 1 into close contact with the step 4a exerts on the first elastic member 1. This is because the first threaded portions are threaded in opposed relation to the second threaded portions. Since the first elastic member 1 is always brought into close contact with the step 4a upon the screwing of the nut 5 over the shaft 4, the relative positional relationship between the first elastic member 1 and the step 4a is always maintained the same. By constructing a vibration wave driving apparatus (ultrasonic motor) using the above-described vibration member in a manner similar to those shown in FIGS. 14 and 15, therefore, the pressing force of a spring 15 for pressing a rotor 7 against the vibration member can be adjusted more easily because the distance between opposing surfaces of a flange 10 and the first elastic member 1 is always constant.

Prior to screwing and fastening the nut 5, it is preferable that the axes and rotational phases of the multilayered piezoelectric device 3 and the second elastic member 2 be properly adjusted. Also, at the time of fastening the nut 5, an axial prestress is desirably applied to the second elastic member 2 for retaining it stationary so as to prevent unintentional rotation of the multilayered piezoelectric device 3.

Further, in order to apply a desired compressive force to the sandwich portion, the nut 5 is fastened while retaining the elastic members 1 and 2 stationary.

Figure 2:
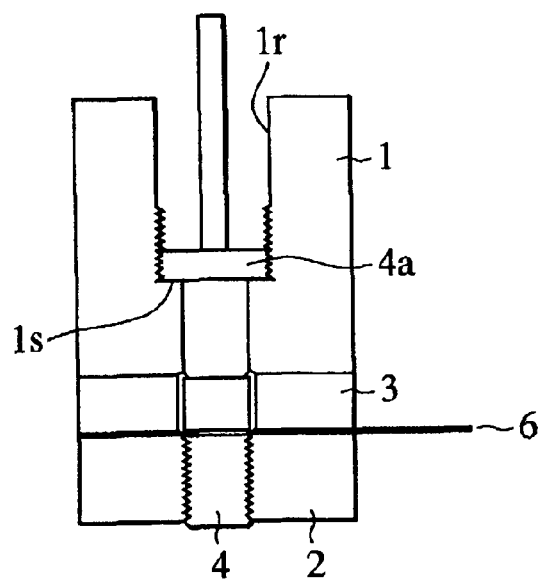
FIG. 2 is a sectional view of a modification of the vibration member, shown in FIG. 1, according to the present invention.
Figure 3:
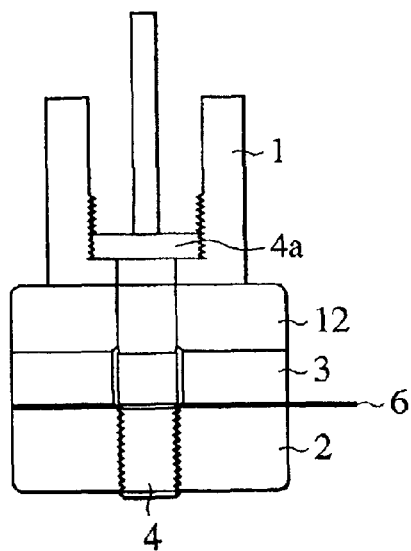
FIG. 3 is a sectional view of a modification of the vibration member, shown in FIG. 1, according to the present invention.

Vibration members shown in FIGS. 2 and 3 are modifications of the vibration member shown in FIG. 1. In the vibration members of FIGS. 2 and 3, the first elastic member 1 has an increased axial length, which lowers the resonance frequency of a bending vibration generated therein. If the first elastic member 1 is simply increased in length as a whole, the overall length of the vibration member (i.e., the length up to a shaft distal end) would be enlarged. To avoid such a drawback, an axial concave recess 1r having a larger inner diameter than a through hole for penetration of the shaft 4 is formed in the first elastic member 1, and the step 4a of the shaft 4 is fitted in the recess 1r. In other words, the first elastic member 1 is provided with a through hole having two different inner diameters, where the diameter is changed midway through the first elastic member 1 so as to form a stepped portion 1s, and the step 4a of the shaft 4 is abutted against the stepped portion 1s of the through hole.

Right-handed second threaded portions are formed at the outer periphery of the lower end of the shaft 4 and an inner periphery of the second elastic member 2. Left-handed first threaded portions are formed at an inner periphery of the recess of the first elastic member 1 and an outer periphery of the step 4a of the shaft 4.

FIG. 3 has a modified structure including a third elastic member 12 interposed between the first elastic member 1 and the piezoelectric device 3. This structure has a resonance frequency still lower than the resonance frequency of the vibration member of FIG. 2. For that purpose, the third elastic member 12 having the same diameter as that of the piezoelectric device 3 is disposed between the first elastic member 1 and the piezoelectric device 3 to ensure a sufficient force for fixedly sandwiching the piezoelectric device 3 while reducing the outer diameter of the first elastic member 1.

In the vibration members of FIGS. 2 and 3, the second elastic member 2 also performs the functions of the nut 5 shown in FIG. 1. To that end, right-handed threaded portions are formed on the second elastic member 2 and the shaft 4.

By screwing and fastening the second elastic member 2 after fitting the first elastic member 1, the third elastic member 12, the piezoelectric device 3 and the flexible printed circuit board 6 to be held against the step 4a, the components sandwiched between step 4a and the second elastic member 2 are fixed under a compressive force.

The screwing of the second elastic member 2 causes the shaft 4 to rotate in the same direction as that in which the second elastic member 2 is turned, and a force pushing the first elastic member 1 into close contact with the step 4a is also exerted on the first elastic member 1 through the action of left-handed threads. As with the vibration member of FIG. 1, therefore, the relative positional relationship between the first elastic member 1 and the step 4a always can be maintained the same when the components sandwiched between step 4a and the second threaded portions are firmly fixed.

Figure 4A:
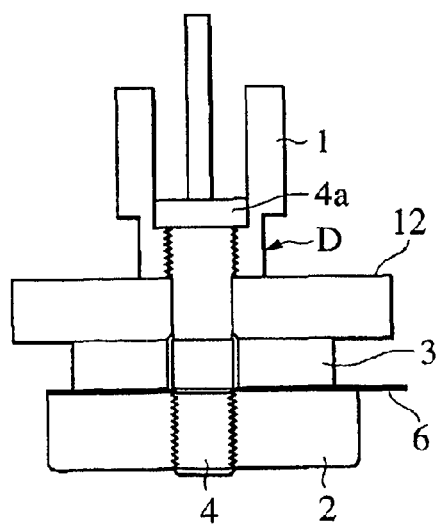
FIGS. 4A and 4B are sectional views of a modification of the vibration member, shown in FIG. 1, according to the present invention.
Figure 4B:
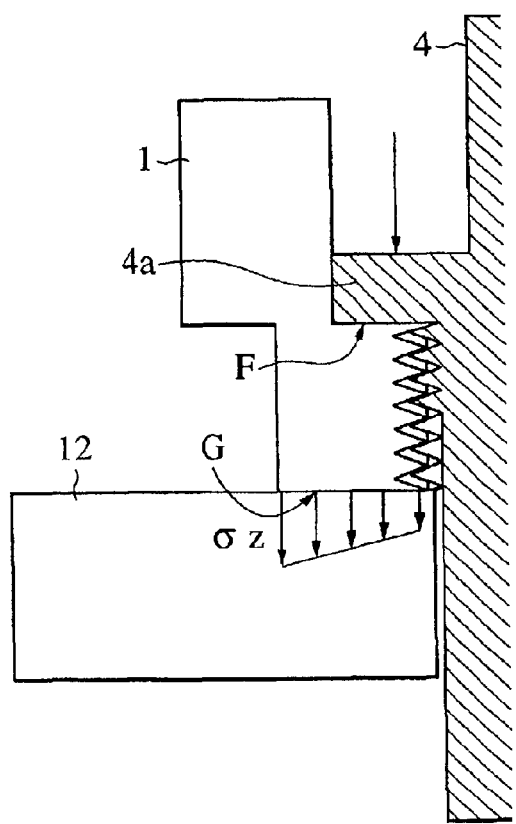

FIG. 4 illustrates an altercative modification of the vibration member shown in FIG. 1. In order to further lower the resonance frequency from that of the vibration member of FIG. 3, a portion of the first elastic member 1 contacting the third elastic member 12 is formed so as to have a reduced outer diameter (as indicated by D in FIG. 4). Further, as shown in FIG. 4B, the left-handed first threaded portion is formed on a portion of the shaft 4 below the step 4a, i.e., on the sandwich portion side of the shaft 4, so that a surface G of the first elastic member 1 contacting the third elastic member 12 develops a surface pressure distribution in which the surface pressure gradually increases as the radial distance increases, i.e., toward an outer radial periphery of the shaft 4. As a result, the step 4a of the shaft 4 up to its outermost periphery serves as pressing points in the vibration member of this modification.

With that structure, wherein a pressure applied to the contact surface between the elastic members 1 and 12 increases toward the outer periphery side, a variation in the resonance frequency can be reduced and a vibration member having stable characteristics can be constructed.

Further, in the above structure, since, as shown in FIG. 4B, the area of a contact surface F between the first elastic member 1 and the shaft step 4a increases from that obtained in the vibration member of FIG. 3 (because the maximum inner diameter of the contact surface F is smaller than that at the thread valley if the threads are formed at the outermost periphery of the shaft), the surface pressure exerted on the contact surface F becomes smaller than that obtained in the vibration member of FIG. 3. Accordingly, it is possible to prevent plastic deformations of materials forming the contact surface F and to prevent deterioration of vibration characteristics with time.

Figure 5A:
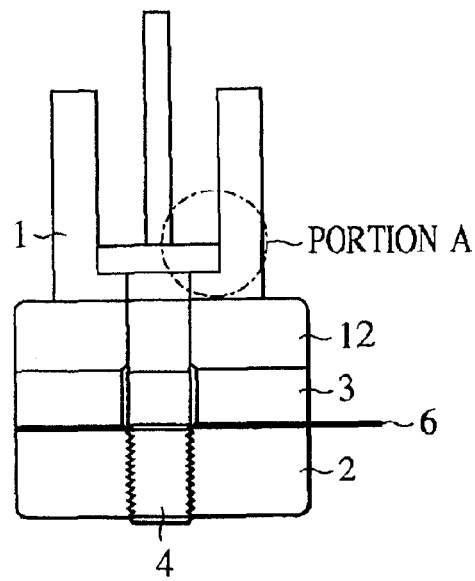
FIGS. 5A and 5B are sectional views of a vibration member according to another embodiment of the present invention.
Figure 5B:
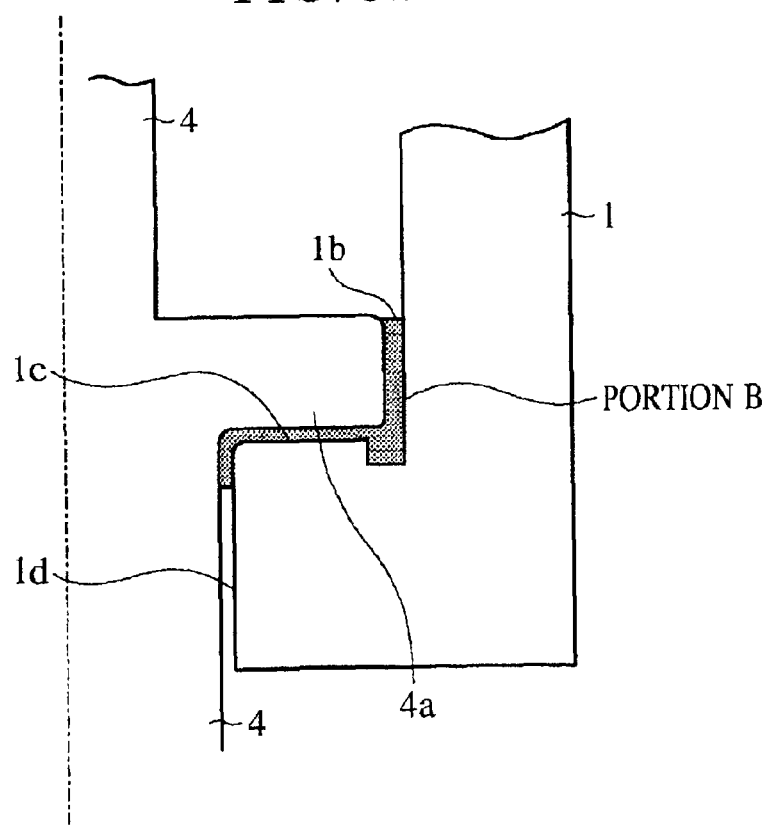

FIGS. 5A and 5B show a vibration member according to another embodiment of the present invention. FIG. 5A is a longitudinal sectional view of the vibration member, and FIG. 5B is an enlarged view of a portion A in FIG. 5A.

In the vibration member of FIG. 5, the first elastic member 1 and the shaft 4 are fixed together by filling an adhesive into not only a gap 1b between an inner peripheral surface of the recess of the first elastic member 1, in which the step 4a of shaft 4 is fitted, and an outer peripheral surface of the step 4a, but also a gap 1c between the lower surface of the step 4a and a bottom surface of the recess of the first elastic member 1 against which the step 4 is abutted. The shaft 4 and the first elastic member 1 are thereby joined to each other. A material attenuating vibrations to not-a-few extent, i.e., an adhesive, should not be filled in an area 1d under the step 4a because such a material is subjected to large distortions due to the vibrations excited on the vibration member. The type of the adhesive is not limited to a particular one. Any generally available adhesive (such as those based on epoxy and cyanoacrylate) can be used, but a material causing the lowest possible vibration attenuation, i.e., a material having the highest possible hardness after curing, is preferable from the standpoint of improving the vibration characteristics of the vibration member. Also, when the vibration member is used in a high temperature environment, or when the vibration member generates a large amount of heat, the use of an adhesive having superior temperature characteristics is preferable.

With this embodiment, since the shaft 4 and the first elastic member 1 are fixed together by an adhesive, the relative positional relationship between the shaft 4 and the first elastic member 1 is fixed, that is, it is not changed when the second elastic member 2 is screwed and fastened.

Alternatively, the first elastic member 1 and the shaft 4 may be joined together by soldering or blazing instead of using an adhesive. The soldering can be applied to any position at which the first elastic member 1 and the shaft 4 are tolerance fitted or closely contacted with each other, e.g., to the first threaded portions in the vibration member of FIG. 1, or the portions in the vibration member of FIG. 5 in which the adhesive is filled. Also, any kind of solder may be used so long as it can firmly fix the two components together.

As another alternative, the shaft 4 may be press-fitted into the first elastic member 1. In other words, the inner diameter of the recess of the first elastic member 1 and the outer diameter of the step 4a of the shaft 4 or the area under the step 4a of the shaft 4 may be selected such that the first elastic member 1 and the step 4a are fixed together by interference fitting. Shrink fitting is one practical example of interference fitting. Further, to increase the joining strength between the two components, the outer circumference of a fitting portion of the shaft 4 may be subjected to a roughing process, e.g., knurling.

Figure 6:
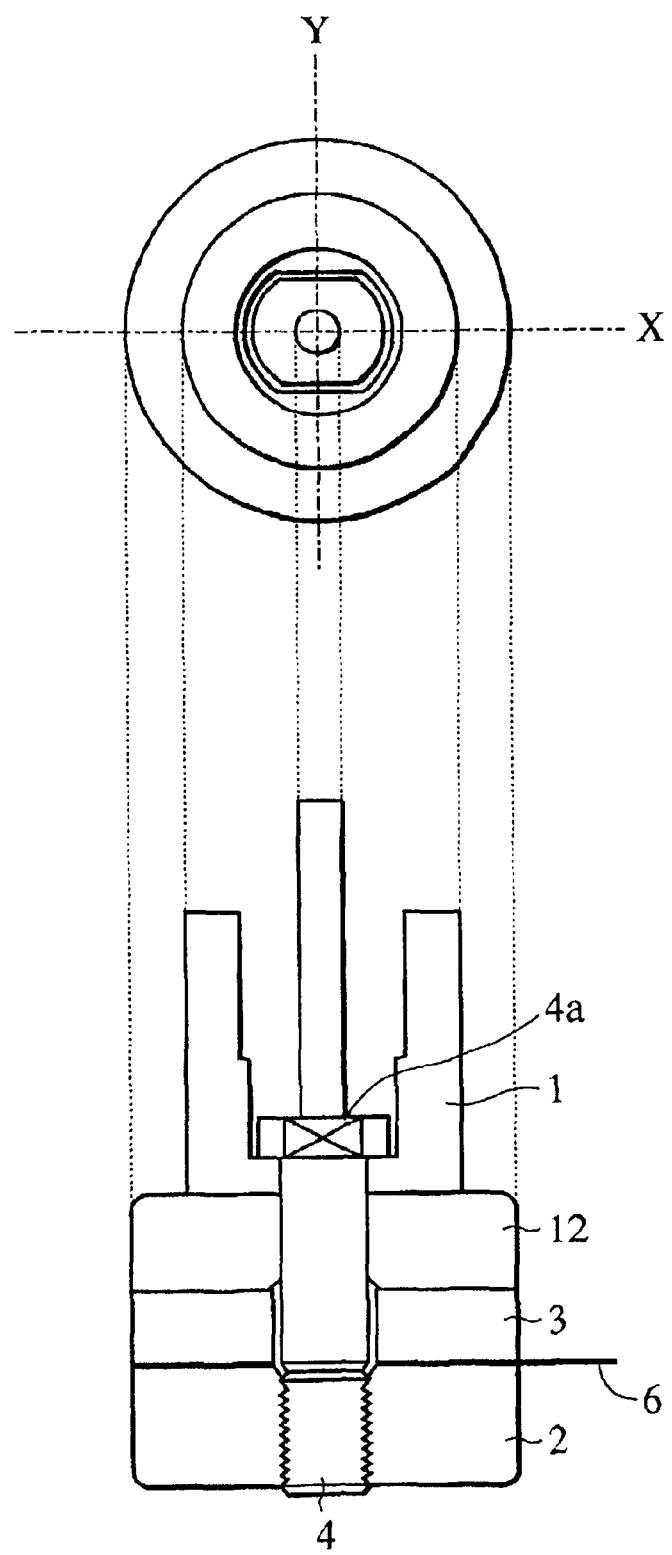
FIG. 6 is a set of a sectional view and a plan view of a vibration member according to still another embodiment of the present invention.

FIG. 6 shows a vibration member according to still another embodiment of the present invention. In the vibration member shown in FIG. 6, the step 4a of the shaft 4 is formed to have a D-cut sectional shape and the portion of the first elastic member 1 fitting to the shaft step 4a is formed to have a complementary shape so that the shaft 4 is restricted from rotating about its own axis relative to the first elastic member 1.

In the fitting portion having the above structure, the first elastic member 1 and the shaft 4 are allowed to freely move in the thrust direction until the first elastic member 1 is abutted against the step 4a, but they are not able to freely rotate relative to each other because the oval/oblong shape of shaft 4 is restricted from rotating about its own axis.

Figure 7:
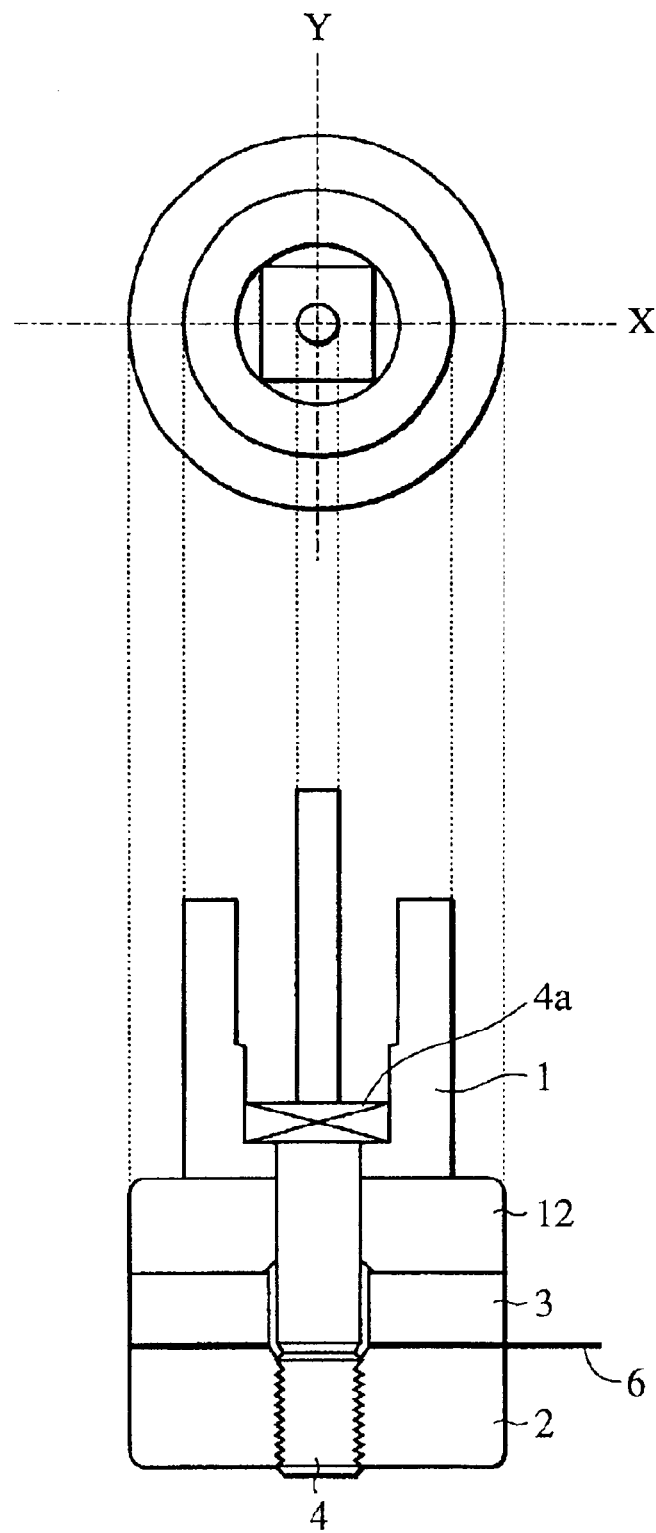
FIG. 7 is a set of a sectional view and a plan view of a modification of the vibration member, shown in FIG. 6, according to the present invention.

FIG. 7 illustrates another alternative modification of the vibration member shown in FIG. 6. This modification differs from the vibration member of FIG. 6 in that the shaft step 4a is formed to have a square sectional shape. When bending vibrations are excited on the elastic members shown in FIGS. 6 and 7, the first elastic member 1 having a smaller diameter is deformed to a much larger extent than the third elastic member 12, the multilayered piezoelectric device 3 and the second elastic member 2, which are located below the first elastic member 1. Such deformations cause large distortions, particularly in an area in the vicinity of the fitting portion between the shaft step 4a and the recess of the first elastic member 1 in FIGS. 6 and 7.

Since the step 4a undergoes large distortions, its sectional shape imposes a great effect upon the resonance frequency of bending vibration of the vibration member. For that reason, the step 4a is preferably formed to have a sectional shape symmetrical about the axis of the shaft 4. When the sectional shape of the step 4a is not symmetrical about the shaft axis, as in the vibration member of FIG. 6, it is difficult to match the resonance frequencies of two modes of orthogonal bending vibrations with each other. For example, when sectional secondary moments with respect to two orthogonal axes (X and Y axes) are equal to each other, as obtained with a plan view in an upper part of FIG. 7, magnitudes of bending rigidity are also equal to each other, and the resonance frequencies of the two orthogonal bending vibrations are matched with each other. However, when the step 4a has such a shape in which the sectional secondary moments with respect to the X and Y axes are not equal to each other, as in the vibration member of FIG. 6, the resonance frequencies of the two orthogonal bending vibrations are generally not matched with each other. Accordingly, the shape of the elastic member must be adjusted by machining so as to make the resonance frequencies in two orthogonal axes matched with each other.

While FIG. 7 illustrates the step 4a having a square section, the step 4a may have any regular geometrical sectional shape, e.g., a regular octagonal shape, so long as sectional secondary moments with respect to two orthogonal axes are equal to each other.

Figure 8:
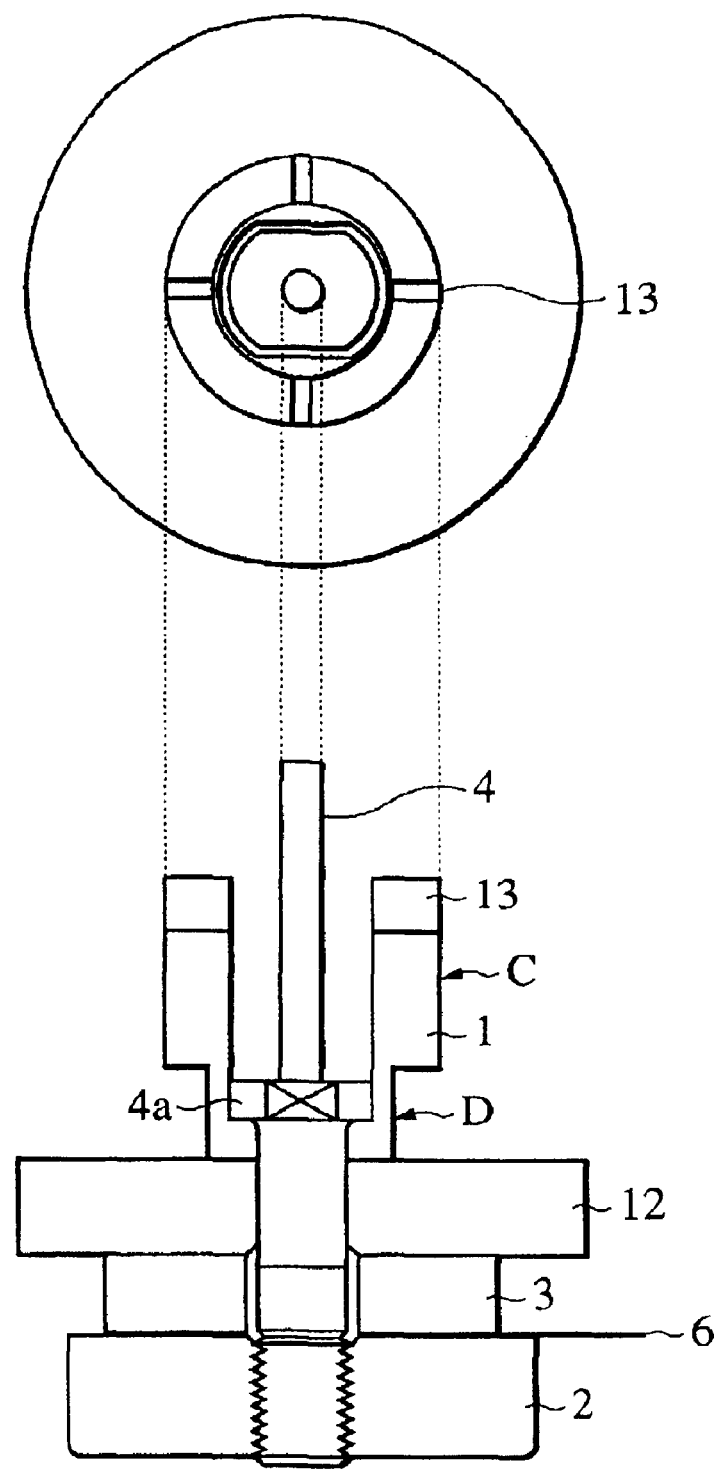
FIG. 8 is a set of a sectional view and a plan view of another modification of the vibration member, shown in FIG. 6, according to the present invention.

FIG. 8 illustrates another alternative modification of the vibration member shown in FIG. 6. In this modification, in order to further lower the resonance frequency of bending vibration of the vibration member, the axial length of the first elastic member 1 is increased and the diameter of the first elastic member 1 is reduced in its portion D adjacent to the third elastic member 12, which is subjected to large distortions due to vibrations.

The step 4a of the shaft 4 is formed to have a D-cut sectional shape and the portion of the first elastic member 1 fitted to the shaft step 4a is formed to have a complementary shape so that the shaft 4 and the first elastic member 1 are restricted from rotating about the shaft axis relative to each other.

In order to assemble the vibration member of this modification and impart a predetermined sandwiching force between the first elastic member 1 and the nut 2, a predetermined fastening torque must be applied by gripping the first elastic member 1 and the nut 2. However, since the first elastic member 1 is formed to have a thin wall as shown, the first elastic member 1 may be deformed when turning the first elastic member 1 while gripping its outer peripheral portion C.

Such a deformation causes a distortion in the cylindrical form of the first elastic member 1 and hence a distortion in the contact surface between the first elastic member 1 and the third elastic member 12. This results in disadvantages that the frequencies of two vibration modes of the vibration member in the orthogonal X and Y directions are not matched with each other and vibration characteristics of the vibration member are adversely affected.

In view of the above, slits 13 are formed in an upper end surface of the first elastic member 1 so that the first elastic member 1 may be turned or pressed so as to be kept stationary using a jig fitted to the slits 13. With that structure, the vibration member can be assembled without imposing extra external forces upon the first elastic member 1.

While four slits 13 are formed by way of example in the vibration member shown in FIG. 8, so as to make the first elastic member 1 symmetrical about the X- and Y-axes, the number of slits is a matter of choice in design.

Figure 9:
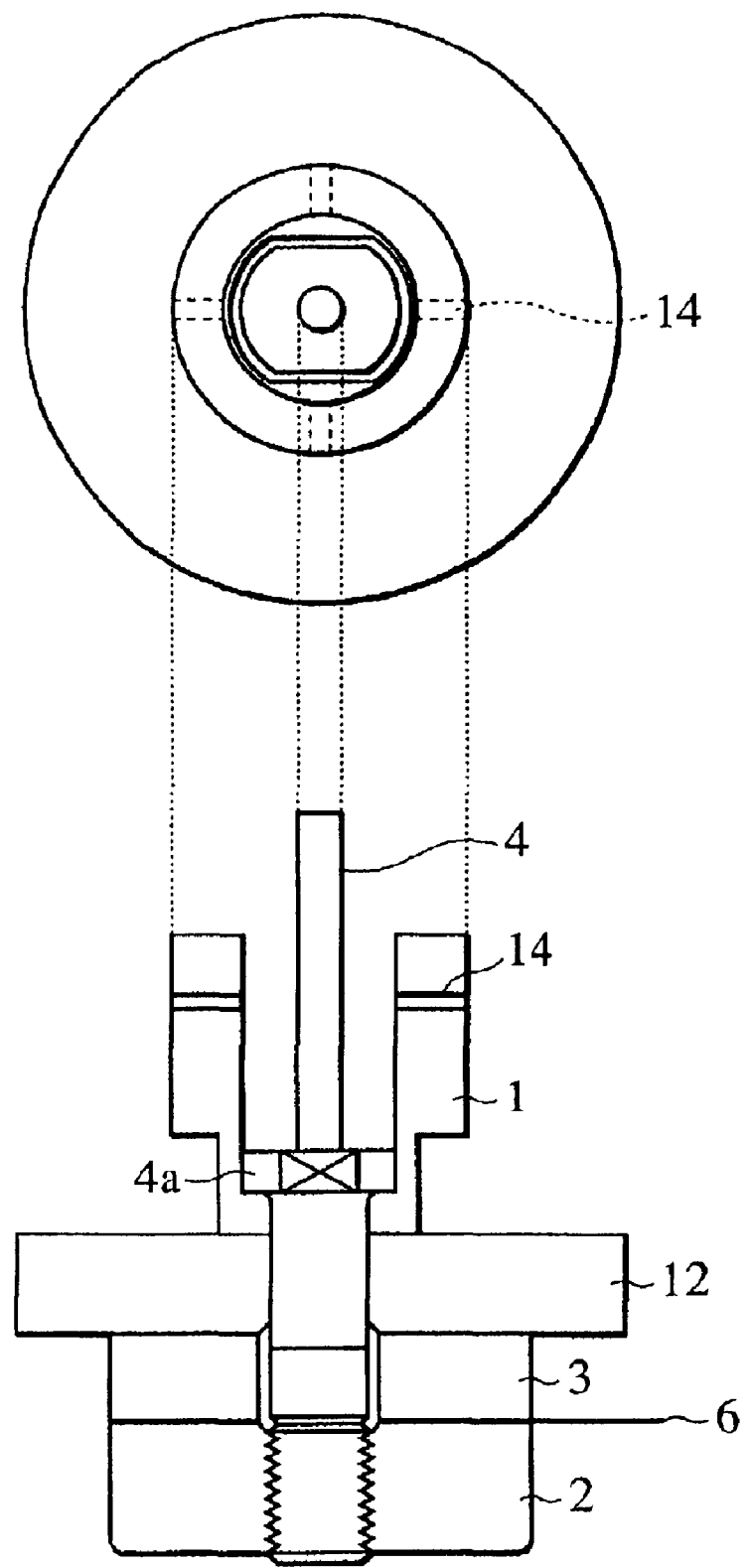
FIG. 9 is a set of a sectional view and a plan view of still another modification of the vibration member, shown in FIG. 6, according to the present invention.

FIG. 9 illustrates another alternative modification of the vibration member shown in FIG. 6. In this modification, the step 4a of the shaft 4 is formed to have a D-cut sectional shape and the portion of the first elastic member 1 fitted to the shaft step 4a is formed to have a complementary shape so that the shaft 4 and the first elastic member 1 are restricted from rotating about the shaft axis relative to each other.

The vibration member of FIG. 9 differs from that of FIG. 8 in that four holes 14 are formed in peripheral walls of the first elastic member 1 instead of forming the slits in the upper end surface of the first elastic member 1. A desired compressive force may be applied to the vibration member by fitting a jig to at least one of the holes 14 and turning the first elastic member 1 or retaining it stationary.

While the holes 14 are formed as through holes in FIG. 9, they are not limited to through holes so long as the function of providing a sufficient torque can be realized with a jig fitted to at least one of the holes. Also, the number of the holes shown is by way of example, again providing symmetry, and is not required to be four.

Figure 10:
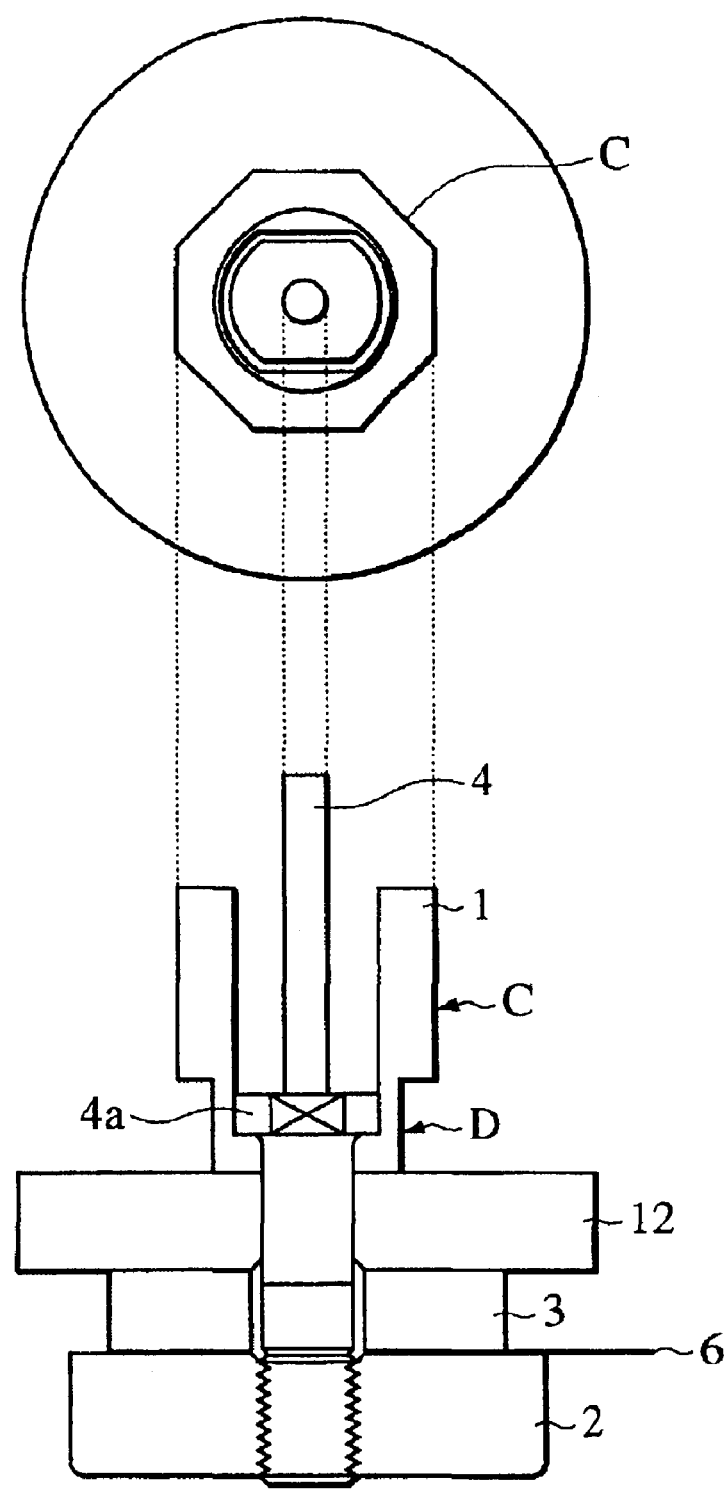
FIG. 10 is a set of a sectional view and a plan view of still another modification of the vibration member, shown in FIG. 6, according to the present invention.

FIG. 10 illustrates another alternative modification of the vibration member shown in FIG. 6. In this modification, the step 4a of the shaft 4 is formed to have a D-cut sectional shape and the portion of the first elastic member 1 fitted to the shaft step 4a is formed so as to have a complementary shape. The first elastic member 1 has a larger outer periphery C having a regular octagonal form so that the first elastic member 1 can be turned with a tool such as a spanner or wrench. While the larger outer periphery C of the first elastic member 1 has a regular octagonal form in FIG. 10, alternatively the smaller outer periphery D of the first elastic member 1 may instead have the regular octagonal form, so as to provide a structure for tightening using a spanner as wrench. Also, the form of the outer periphery of the first elastic member 1 is by way of example, and is not limited to a regular octagonal form.

Figure 11A:
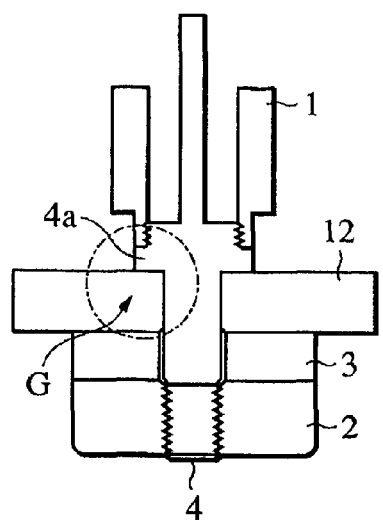
FIGS. 11A and 11B are sectional views of a vibration member according to still another embodiment of the present invention.
Figure 11B:
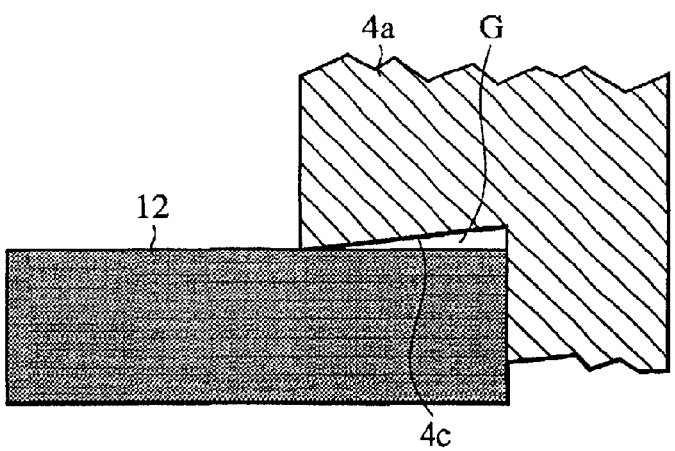

FIGS. 11A and 11B show a vibration member according to still another embodiment of the present invention. Right-handed second threaded portions are formed at the outer periphery of the lower end of the shaft 4 and the inner periphery of the second elastic member 2, allowing the lower end of the shaft 4 and the second elastic member 2 to be joined together by screwing. Left-handed first threaded portions are formed at an outer periphery of an upper portion of the step 4a of the shaft 4 and the inner periphery of the first elastic member 1, allowing the upper portion of the step 4a and the first elastic member 1 to be joined together by screwing. The upper portion of the step 4a has a larger outer diameter than that of its lower portion. The third elastic member 12 and the piezoelectric device 3 are sandwiched between the step 4a and the second elastic member 2. The vibration member of this embodiment differs from those of the above-described embodiments in that the outer diameter of the first elastic member 1 is substantially equal to that of the lower portion of the step 4a, and the step 4a is contacted to the third elastic member 12, but the first elastic member 1 is not contacted to the third elastic member 12. The first elastic member 1 is formed so as to have a smaller outer diameter on the side contacting the step 4a for the purpose of lowering the resonance frequency of the overall vibration member.

The vibration member shown in FIG. 11 is superior in that the vibration member can be assembled with a sufficiently high compressive force applied to the third elastic member 12 without depending on the material of the first elastic member 1.

In the case of the vibration member shown in FIG. 10, for example, the contact surface between the two elastic members 1 and 12 is subjected to large compressive forces caused upon sandwiching the two elastic members 1 and 12 between the step 4a of the shaft 4 and the second elastic member 2, and to compressive forces caused by bending components of vibrations excited in the vibration member. Those compressive forces are increased particularly in the smaller diameter portion of the shaft 4 because distortions due to bending are increased in that portion.

On the other hand, the first elastic member 1 is a component greatly affecting the resonance frequency of the vibration member. The desire to lower the resonance frequency of the vibration member is realized by reducing the outer diameter of the portion (denoted by D) of the first elastic member 1 adjacent to the third elastic member 12, or by selecting a material having a smaller Young's modulus, e.g., brass (Bs). However, there is a limit as to how much the outer diameter of the portion D of the shaft may be reduced, and a material having a small Young's modulus is disadvantageous in that it generally exhibits a low level of material strength (tensile and compressive strength). In other words, if the elastic members are made of SUS or other similar material so as to ensure a sufficient strength of the contact surface between the two elastic members 1 and 12, the resonance frequency of the vibration member will be increased. For example, on condition that the outer diameter of the third elastic member 12 is 10 mm, the length from the second elastic member 2 to the first elastic member 1 is 10 mm, and the components other than the piezoelectric device 3 are made of iron-based materials, the vibration member will have a resonance frequency in the range of 80 to 100 kHz.

If Bs, for example, is selected as the material of the first elastic member 1 with the desire to lower the resonance frequency of the vibration member, there will arise a risk that a part of the first elastic member 1 may be plastically deformed and stable characteristics may be impaired because of a low level of material strength. Thus, the first elastic member 1 of the vibration member of FIG. 10 is required to satisfy certain conditions from the standpoints of the Young's modulus and strength, and available materials satisfying those conditions are restricted to a very few.

Taking into account the above conditions, in the vibration member of FIGS. 11A and 11B, the surface contacting the third elastic member 12, which is subjected to large compressive forces, is constituted solely by the shaft 4, and the first elastic member 1 is disposed so as to be free from the large compressive forces. With this structure, the first elastic member 1 is no longer required to have a high level of strength, and flexibility in selecting the material of the first elastic member 1 is increased.

Additionally, as shown in FIG. 11B, the surface of the step 4a of the shaft 4 contacting the third elastic member 12 may be formed into a tapered shape so that the outer periphery of the step 4a most strongly contacts the third elastic member 12. This structure provides stress distribution in a contact surface G of the third elastic member 12, in which the stress gradually increases toward the outer radial periphery (namely the surface pressure imposed on the third elastic member 12 gradually increases with the radius, i.e., in a direction toward the outer radial periphery).

Figure 12:
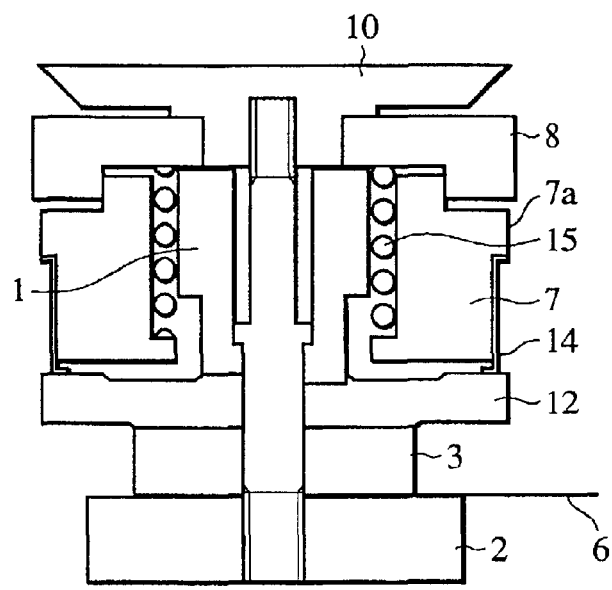
FIG. 12 is a sectional view of a vibration wave driving apparatus (ultrasonic motor) using one of the vibration members shown in FIGS. 1 to 11.
Figure 13A:
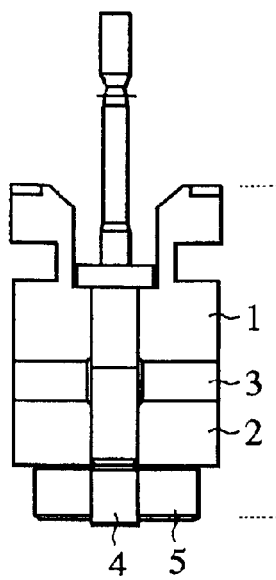
FIGS. 13A and 13B are a sectional view of a conventional bar-shaped vibration member and a graph showing a vibration mode.
Figure 13B:
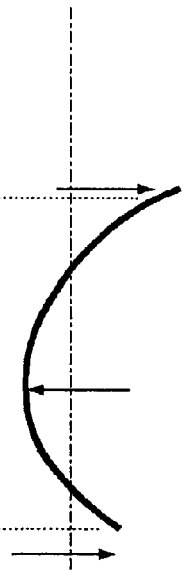

FIG. 12 shows an ultrasonic motor as one kind of vibration wave driving apparatus, which includes the vibration member of FIG. 8. The vibration member used in this ultrasonic motor may be replaced with any of the above-described vibration members of FIGS. 1 to 11.

The third elastic member 12 is formed of a material having good wear resistance characteristics (e.g., an alumina plate). A rotor 7 includes a spring ring 14, having proper resiliency, provided below a main rotor ring 7a. A distal end surface of the spring ring is positioned in contact with the surface of the third elastic member 12. At an opposite surface of the rotor 7, a projection (radially inward) (or a recess, radially outward) is formed for fitting to a mating recess (or projection) of a gear 8 that is rotated together with the rotor for transmitting a motor output. The rotor 7 in the form of a circular ring has an inner diameter larger than the outer diameter of the first elastic member 1 covers the entirety of the first elastic member 1 when viewed from the outside. The rotor 7 is pressed against the third elastic member 12 by a resilient member (spring) 15 disposed between the rotor 7 and the gear 8 rotating together with the rotor 7.

The gear 8 is pressed with the reaction force of the spring 15 against a flange 10 for supporting the motor. Since the gear 8 is fitted to the rotor 7 through a proper radial clearance, the gear 8 can smoothly rotate without causing a wobble when the rotor 7 is rotated.

When two AC signals having different phases are applied to the piezoelectric device 3 from a power supply circuit (not shown) through the flexible printed circuit board 6, traveling waves are excited on the surface of the third elastic member 12. The rotor 7 contacting the surface of the third elastic member 12 under pressing is pushed by the traveling waves so as to rotate through frictional forces generated between the rotor 7 and the third elastic member 12.

The ultrasonic motor of FIG. 12 is advantageous in that, since the rotor 7 is disposed around the vibration member, the axial length of the motor can be reduced and a smaller size motor can be realized.

While the second threaded portions are formed in the second elastic member 2 and the shaft 4 in the vibration members of FIGS. 2 to 12, those vibration members may be modified such that the second threaded portions are formed in the nut 5 and the shaft 4, as with the vibration member of FIG. 1.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A vibration member for use in a vibration wave driving apparatus, said vibration member comprising:

an elastic member having a through hole;

a fastening member having a threaded portion;

an electro-mechanical energy transducer having a through hole; and a shaft inserted into the through holes of said elastic member and said electro-mechanical energy transducer, said shaft having a threaded screw portion that meshes with the threaded portion of said fastening member, and a step that restricts a position of said elastic member relative to said shaft in a thrust direction, wherein said elastic member is sandwiched between said step of said shaft and said fastening member and fixed therebetween by screwing and fastening the threaded screw portion of said shaft with the threaded portion of said fastening member, and said shaft is restricted from rotating relative to said elastic member.

2. A vibration member according to claim 1, wherein said elastic member has a recess formed in a shape fitted to said step of said shaft in a manner that substantially prevents relative rotation therebetween.

3. A vibration member according to claim 1, wherein said shaft and said elastic member are joined to each other in a manner that substantially prevents relative rotation therebetween.

4. A vibration member according to claim 3, wherein said shaft and said elastic member are joined to each other by one of bonding, soldering and press-fitting.

5. A vibration member according to claim 1, wherein said elastic member has a plurality of slits extending in a radial and axial direction of said shaft, and arranged at intervals in the circumferential direction.

6. A vibration member according to claim 5, wherein said slits are formed symmetrically in the circumferential direction.

7. A vibration member according to claim 1, wherein said elastic member has a plurality of recesses formed in an outer peripheral surface thereof.

8. A vibration member according to claim 7, wherein said plurality of recesses are formed symmetrically in an outer peripheral surface thereof.

9. A vibration member according to claim 1, wherein said fastening member is another elastic member.

10. A vibration member according to claim 1, wherein said fastening member is a nut.

11. A vibration member according to claim 1, further comprising another elastic member disposed between said elastic member and said electro-mechanical energy transducer.

12. A vibration member according to claim 1, wherein said electro-mechanical energy transducer also is sandwiched and fixed between said step and said fastening member.

13. A vibration member for use in a vibration wave driving apparatus, said vibration member comprising:
an elastic member having a through hole formed with a threaded portion in an inner wall thereof;
a fastening member having a threaded portion;
an electro-mechanical energy transducer having a through hole; and
a shaft inserted into the through holes of said elastic member and said electro-mechanical energy transducer, said shaft having a first threaded screw portion that meshes with the threaded portion of said elastic member, a second threaded screw portion that meshes with the threaded portion of said fastening member so as to cause rotation in an opposed direction to said first threaded screw portion, and a step that restricts a position of said elastic member relative to said shaft in a thrust direction,
wherein said elastic member and said electro-mechanical energy transducer both are sandwiched between said step and said fastening member, and are fixed therebetween by screwing and fastening the second threaded screw portion of said shaft with the threaded portion of said fastening member.

14. A vibration member according to claim 13, wherein said fastening member is another elastic member.

15. A vibration member according to claim 13, wherein said fastening member is a nut.

16. A vibration member according to claim 13, further comprising another elastic member disposed between said elastic member and said electro-mechanical energy transducer.

17. A vibration member according to claim 13, wherein said electro-mechanical energy transducer also is sandwiched and fixed between said step and said fastening member.

18. A vibration wave driving apparatus comprising:
a vibration member comprising:
an elastic member having a through hole;
a fastening member having a threaded portion;
an electro-mechanical energy transducer having a through hole; and
a shaft inserted into the through holes of said elastic member and said electro-mechanical energy transducer, said shaft having a threaded screw portion that meshes with the threaded portion of said fastening member, and a step that restricts a position of said elastic member relative to said shaft in a thrust direction,
wherein said elastic member is sandwiched between said step of said shaft and said fastening member and fixed therebetween by screwing and fastening the threaded screw portion of said shaft with the threaded portion of said fastening member, and said shaft is restricted from rotating relative to said elastic member; and
a rotor pressed against said vibration member under a predetermined pressing force and rotatably driven about said shaft of said vibration member by a friction force generated by vibration in said vibration member.

19. A vibration wave driving apparatus comprising:
a vibration member comprising:
an elastic member having a through hole formed with a threaded portion in an inner wall thereof;
a fastening member having a threaded portion;
an electro-mechanical energy transducer having a through hole; and
a shaft inserted into the through holes of said elastic member and said electro-mechanical energy transducer, said shaft having a first threaded screw portion that meshes with the threaded portion of said elastic member, a second threaded screw portion that meshes with the threaded portion of said fastening member so as to cause rotation in an opposed direction to said first threaded screw portion, and a step that restricts a position of said elastic member relative to said shaft in a thrust direction,
wherein said elastic member and said electro-mechanical energy transducer both are sandwiched between said step and said fastening member, and are fixed therebetween by screwing and fastening the second threaded screw portion of said shaft with the threaded portion of said fastening member; and
a rotor pressed against said vibration member under a predetermined pressing force and rotatably driven about a shaft of said vibration member by a friction force generated by vibration in said vibration member.

* * * * *

UNITED STATES PATENT AND TRADEMARK OFFICE
CERTIFICATE OF CORRECTION

PATENT NO. : 6,888,288 B2 Page 1 of 1
DATED : May 3, 2005
INVENTOR(S) : Hiroyuki Seki et al.

It is certified that error appears in the above-identified patent and that said Letters Patent is hereby corrected as shown below:

Column 5,
Line 48, "locating" should read -- located --.

Column 10,
Line 63, "FIG. 11" should read -- FIGS. 11A and 11B --.

Signed and Sealed this

Eleventh Day of April, 2006

JON W. DUDAS
*Director of the United States Patent and Trademark Office*